United States Patent
Walsh

(10) Patent No.: US 6,834,714 B2
(45) Date of Patent: Dec. 28, 2004

(54) VARIABLE CONSTANT VOLUME COOLING/ HEATING UNIT

(76) Inventor: Paul J. Walsh, 4736 E. Apricot La., Gilbert, AZ (US) 85297

( * ) Notice: Subject to any disclaimer, the term of this patent is extended or adjusted under 35 U.S.C. 154(b) by 0 days.

(21) Appl. No.: 10/718,838

(22) Filed: Nov. 21, 2003

(65) Prior Publication Data

US 2004/0104277 A1 Jun. 3, 2004

Related U.S. Application Data

(60) Provisional application No. 60/428,344, filed on Nov. 22, 2002.

(51) Int. Cl.[7] ................................................. F24F 3/00
(52) U.S. Cl. ................ 165/220; 236/12.16; 237/12.3 B
(58) Field of Search ............................. 236/12.1, 12.11, 236/12.16; 165/50, 218, 219, 220, 221; 237/12.3 R, 12.3 B

(56) References Cited

U.S. PATENT DOCUMENTS

| | | |
|---|---|---|
| 2,930,593 A | 3/1960 | Blum |
| 3,024,008 A | 3/1962 | Blum |
| 3,069,867 A | 12/1962 | Ringquist |
| 3,167,116 A | 1/1965 | Egbert |
| 3,171,471 A | 3/1965 | Blum |
| 3,176,759 A | 4/1965 | Windham |
| 3,191,667 A | 6/1965 | Lorenz |
| 3,191,668 A | 6/1965 | Lorenz |
| 3,198,245 A | 8/1965 | Soling |
| 3,288,205 A | 11/1966 | Egbert |
| 3,628,600 A * | 12/1971 | McFarlan .................... 165/220 |
| 3,636,721 A | 1/1972 | Rex |
| 3,648,766 A * | 3/1972 | Whalen ....................... 165/253 |
| 3,670,806 A | 6/1972 | McFarlan |
| 3,729,051 A | 4/1973 | Mannion et al. |
| 3,774,674 A * | 11/1973 | McFarlan .................... 165/210 |
| 3,833,057 A | 9/1974 | Doherty |
| 3,853,172 A | 12/1974 | McFarlan |
| 3,877,513 A | 4/1975 | Arledge, Jr. |
| 3,885,619 A * | 5/1975 | McFarlan ...................... 165/62 |
| 3,908,750 A | 9/1975 | Siegel |
| 3,910,345 A | 10/1975 | Whalen |
| 4,214,626 A * | 7/1980 | Spethmann ................... 62/181 |
| 4,215,551 A * | 8/1980 | Jones ........................... 60/643 |
| 4,300,623 A * | 11/1981 | Meckler ...................... 165/210 |
| 4,367,634 A * | 1/1983 | Bolton ....................... 62/238.6 |
| 4,413,478 A | 11/1983 | McFarlan |
| 4,419,864 A | 12/1983 | McFarlan |
| 4,481,790 A * | 11/1984 | Mattes ....................... 62/238.6 |
| 4,718,478 A | 1/1988 | Huber |
| 5,181,387 A * | 1/1993 | Meckler ......................... 62/59 |
| 5,372,011 A * | 12/1994 | O'Neal .......................... 62/93 |
| 5,421,169 A * | 6/1995 | Benedict ....................... 62/244 |
| 5,622,221 A * | 4/1997 | Genga et al. ................ 165/208 |

FOREIGN PATENT DOCUMENTS

| | | | |
|---|---|---|---|
| EP | 0766051 A1 | * | 5/1995 |
| WO | WO 89/04443 | * | 5/1989 |

* cited by examiner

Primary Examiner—William E. Tapolcai
Assistant Examiner—Mohammad M. Ali
(74) Attorney, Agent, or Firm—Hodgson Russ LLP

(57) ABSTRACT

A variable constant volume cooling/heating unit comprising a warm fluid delivery pipe; a cool fluid delivery pipe wherein the warm fluid deliver pipe and cool fluid deliver pipe lead to a two position three way valve, a modulating three way valve for mixing the flow of fluid, a thermostat to control the two position three way valve and the modulating three way valve, a return fluid pipe, means for pumping the fluid through a coil and means for drawing air to be conditioned over the coil. A damper controlled by the thermostat for controlling incoming outside out into the variable constant volume cooling/heating unit.

15 Claims, 1 Drawing Sheet

VARIABLE CONSTANT VOLUME COOLING/HEATING UNIT

CLAIM OF PRIORITY

This application claims the benefit of U.S. Provisional Application No. 60/428,344 filed on Nov. 22, 2002.

BACKGROUND

Buildings and other structures must be cooled and heated as simply and efficiently as possible. A past example of a cooling and heating system is shown in U.S. Pat. No. 3,636,721 to Rex (hereinafter the '721 patent). The '721 patent primarily discloses a control system for a thermal storage tank where excess heat is stored during occupied hours and used to heat the building during unoccupied hours without running the refrigeration machine, thus increasing efficiency of the system.

The '721 control system is capable of cooling or heating any zone. All ventilation loads, exterior building transmission loads, interior people loads, equipment loads, and solar loads can be satisfied with this system. The '721 disclosure calls for a four pipe system which employs a pair of chilled water mains piped to a cooling coil and a pair of hot water mains piped to a heating coil. Both coils are located within the fan coil unit and each zone (room or space) can thus be cooled or heated year round.

There are other systems used to cool or heat a building which employ a single pair of mains, wherein during the heating season (winter) hot water is piped to a single coil within the fan coil unit to heat the zone, and wherein during the cooling season (summer) chilled water is piped to the single coil within the fan coil unit to cool the zone. This is called a two pipe system.

This type of two pipe "changeover system" can deliver less than desirable results during the spring and fall of the year, because cool mornings require hot water in the mains and sunny afternoons require chilled water in the mains. Changeover can be thus be lengthy resulting in less than desirable conditions in the zones or spaces or rooms. Additionally, the cold North exposure side of the building may require heat while the sunny South exposure side of the building may, at the same time, require cooling. This necessitates sub-zoning of the building exposures with attendant zone valves and additional piping systems. This all results in a much more complex and expensive system.

There is a need for a better system which can readily heat or cool any zone regardless of the time of the year.

SUMMARY

The present invention is for a variable constant volume cooling/heating unit and system. The system comprises a single chilled water supply pipe, a single hot water supply pipe, a single return pipe, and a control system on a single coil in a fan coil unit which can heat or cool any zone regardless of the time of the year, that is (regardless of the season).

A variable constant volume cooling/heating unit is provided. A hot and cold water is supplied to the unit to heat and cool the room or space. There is a two position three way valve, a warm water runout pipe for supplying warm water, a cold water runout pipe for supplying cold water, with the warm water runout pipe and cold water runout pipe connected to the two position three way valve. A modulating three way valve is provided such that that a supply pipe connects to the two position three way valve and modulating three way valve. The modulating three way valve is located downstream from the supply pipe. A pump is located downstream from the modulating three way valve, and a water coil having a coil outlet is located downstream from the pump, the pump for pumping water through the water coil. There is also a return water main and a return water runout pipe, the return water runout pipe connecting between the coil outlet and the return water main, the return water runout pipe connected to the coil outlet for receiving the flow of return water and connected to the return water main. A connecting pipe connects to the modulating three way valve and return water runout pipe and is for allowing return water to flow to the modulating three way valve and, wherein the modulating three way valve is for allowing all, a portion of, or none of the return water to flow there through.

A thermostat is provided for controlling the two position three way valve, modulating three position valve, pump, and a damper which controls the flow of incoming outside air.

The unit may be mounted above the ceiling of the room it is supplying There is also a ceiling return mounted to the room ceiling

DETAILED DESCRIPTION

Figure 1:
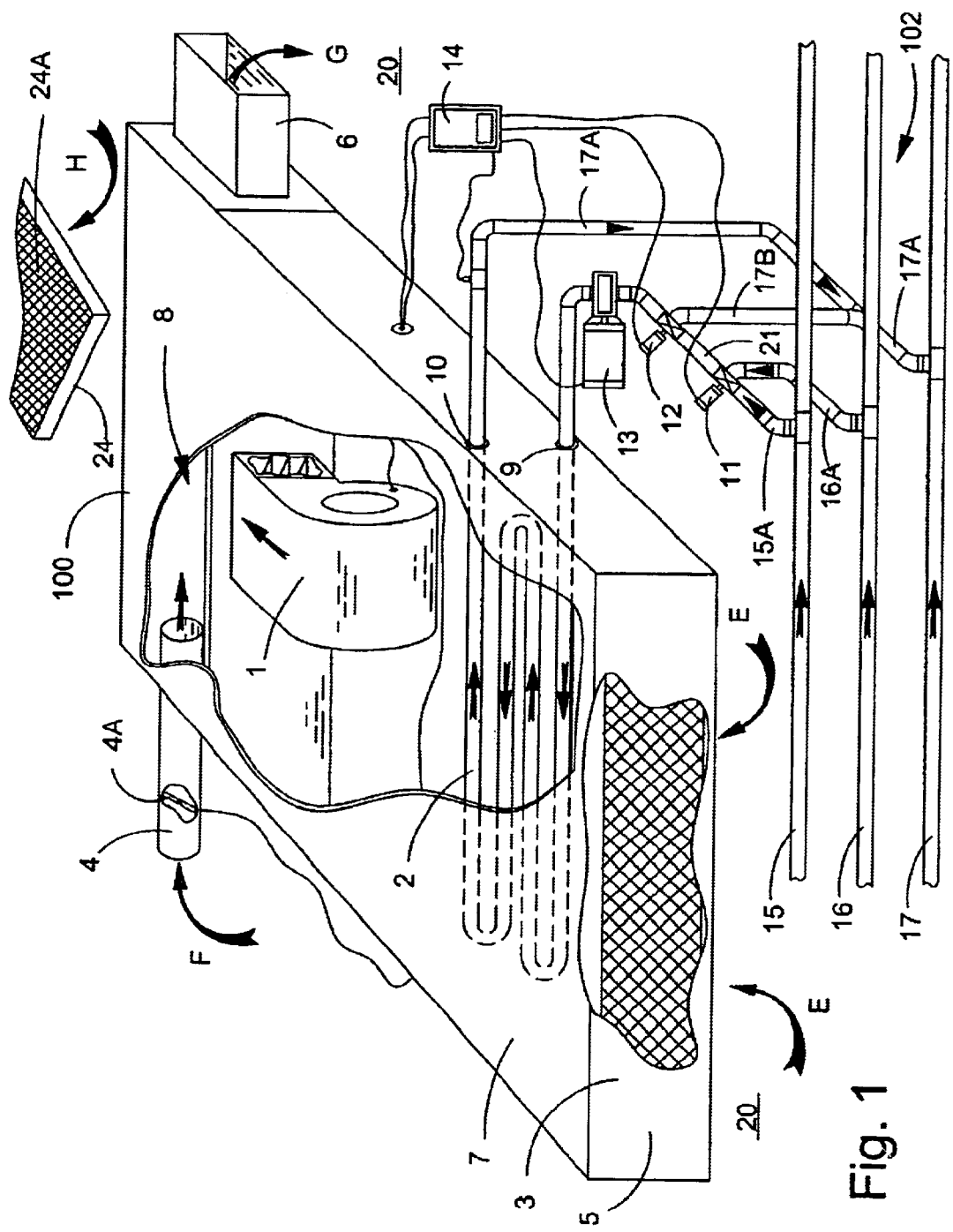
FIG. 1 shows a schematic cutaway view of the variable constant volume cooling/heating unit.

Turning now to FIG. 1, shown therein is a partially cutaway view of the variable, constant volume cooling/heating unit 100. This unit 100 may be mounted, for example, above the ceiling (not shown) of a zone, room, or space 20. A three pipe air conditioning system 102 is provided comprising a cool water main 15, a warm water main 16, and a return water main 17. The cool water main 15 leads to the cool water runout pipe 15A, the warm water main 16 leads to the warm water runout pipe 16A, and the return water runout pipe 17A leads to the return water main 17. The cool water main 15, warm water main 16, and return water main 17 lead from the central equipment room (not shown) which supplies the cool water and warm water. After passing through the unit 100 the return water may be returned through the return water runout pipe 17A to the return main 17. The return water main 17 then returns to the central equipment room. Central equipment rooms typically have a refrigeration machine for generating hot and cool/cold water and are known to those having ordinary skill in the art.

The a water coil 2 is positioned in the unit 100 and is for accommodating warm water or cool water flow. A blower/fan 1 draws room air into the variable constant volume cooling/heating unit 100 and blows conditioned air out of the unit 100 into the zone 20 through the supply air outlet 6 in the direction of the arrow designated G.

Air from two sources is mixed in the air mixing section 8. The first source of air for the air mixing section 8 is outside air which is drawn into the air mixing section through the ventilation air inlet 4. Outside air, indicated by the arrow designated F, enters through inlet 4. Also, the incoming air passing through the ventilation air inlet 4 may be modified before it passes through air inlet 4. For example, if outside temperatures are extremely low, it would not be desirable to move this cold outside air directly through the ventilation air inlet 4 and then directly into the cooling/heating unit 100. Rather, the extremely cold air may be modified, for example warmed and humidified, before it enters the ventilation air inlet 4. The rate of inflowing air through the inlet 4 is controlled by a two-position damper 4A.

The second source of air for the air mixing section 8 is air from the zone or room 20. This return air is drawn into the air return section 8 in the direction of the arrow designated E through the return air inlet 5. The return air passes through a grill with an integral filter 3 which filters the return air so that dust particles are not recirculated into the coil 2 or into the zone or room 20. The return air from the zone or room 20 and the outside air from the ventilation air inlet 4 are drawn into and moved out of the air mixing section 8 by the fan/blower 1. From the air mixing section 8 the conditioned air moves out of the unit 100 through the supply air outlet 6 in the direction of the arrow designated G. Also, the exhaust air from the room 20 is exhausted out of the room 20 through the return air exhaust outlet 24. The return air exhaust outlet 24 has a grill cover 24A and is mounted on the ceiling (not shown). Thus, the unit 100 may be mounted above the ceiling (not shown), and the exhaust air outlet may be mounted on the ceiling (not shown). Thus, each room or zone 20 has its own outside air ventilation inlet 4 and its own return air exhaust outlet 24. This design thus allows Heating and cooling of the zone or room 20 is carried out in the manner described presently. When the room or zone 20 needs to be cooled, water from the cool water main 15 is used. The cool water may be below 75° Fahrenheit and may be about 52° Fahrenheit. The cool water flows through the cool water runout pipe 15A to a two position three-way valve 11. The valve 11 opens so cool water flows through it, while at the same time the two position three way valve 11 is closed to the flow of warm water from the warm water runout pipe 16A. The cool water continues to flowing, and passes through a supply pipe 21 to a modulating three-way valve 12 (the purpose of which will be described presently) and proceeds to the pump 13. Pump 13 pumps the cool water to the water coil inlet 9, through the water coil 2, and out the water coil outlet 10. The cool water in the water coil 2 acts as a heat sink and cools the air in the air return section 7. Then the fan 1 continues to draws in return air into the air return section 7 and the incoming return air continues to be cooled by the coil 2. The fan 1 blows the cooled air into the air mixing section 8, while at the same time outside air enters the air mixing section 8 through the ventilation air inlet 4 and mixes with the air in the air mixing section 8.

Now, the water exiting the coil outlet 10 enters the return runout pipe 17A, as shown in FIG. 1. A thermostat 14 is provided that is in an electronic controlling relationship with the blower 1, the damper 4A, the two position three way valve 11, the modulating three way valve 12, and the pump 13. The thermostat 14 is indicated by the letter T in FIG. 1. The thermostat 14, by controlling one or more of the above listed items, controls the temperature of the room or zone 20.

Continuing with the above description of the cooling cycle, the modulating three way valve 12 is used when water returning from the coil 2 though coil outlet 10 is still below 75° Fahrenheit. This means that the water is still relatively cool and can be reused to again act as a heat sink and remove more heat from the air in the air return section 7. Hence, the water flow is directed by the modulating three way valve 12 which directs the water to again cycle through the water coil 2 and again acts as a heat sink and absorbs heat from the air return section 7. The water again makes its way to the water coils outlet 10, and if it is about 75° Fahrenheit as detected by the thermostat 14, the modulating three way valve 12 directs the water to the return water runout 17A (the modulating three way valve 12 closes to the flow of water from the connecting pipe 17B and the two position three way valve 11 opens once again to the flow of cold water) and from there the water flows into the return main 17. Also, the thermostat 14 instructs the modulating three way valve 12 to open or close thus regulating how much return flow from the water coil outlet 10 should be recirculated through the coil 2.

For example, if the room or zone 20 is very warm and needs to be cooled quickly, the thermostat 14 instructs the two position three way valve 11 to open to the flow of cold water from the cold water runout pipe 15A, and instructs the modulating three way valve 12 to open to allow the flow of cold water there through, and the pump 13 to pump and circulate the cool water through the water coil 2. The return water from the coil 2 flows directly through the return water runout pipe 17A and into the return water main 17. It is noted that no return water from the coil 2 flows through the modulating three way valve 12. This process/cycle is repeated until the thermostat 14 detects that the desired temperature is reached in the room or zone 20.

If, on the other hand, the room 20 is already near the desired temperature and only needs to be slightly cooled, the modulating three way valve 12 is instructed by the thermostat 14 to open accordingly.

When the modulating three way valve 12 opens it regulates how much return flow from the return water runout 17A is allowed to recirculate. For example, if zero gallons of return flow are permitted to recirculate through the modulating three way valve 12 this indicates a high level of cooling is required, and this is the situation described immediately above. But, if only a minor amount of cooling is required, then the thermostat 14 instructs the modulating three way valve 12 to open and allow a portion of the return water in the return water runout pipe 17A to flow through the connecting pipe 17B. The connecting pipe 17B connects between the modulating three way valve 12 and return water runout pipe 17. The return water passes through the modulating three way valve 12 and from there pumped by the pump 13 and recirculated through the water coil 2. For example, the modulating three way valve may open and allow one or two gallons per minute of return water to be recirculated through the water coil 2 along with an amount of water from the cool water runout 15A delivered through the supply pipe 21.

When the return water is at substantially the same temperature as the room or zone 20, the return water has absorbed about all the heat energy it can and the thermostat 14 directs the modulating three way valve 12 to close to the flow of return water. This causes the return water to be directed to the return water runout pipe 17A and to the return water main 17. Thus, the modulating three way valve 12 provides for an energy efficient unit 100.

Similarly, if the room 20 needs to be heated to a temperature of, for example 75° Fahrenheit, warm water flows through warm water main 16 and into warm water runout pipe 16A and up to and into two position three-way valve 11. In this scenario the two position three way valve 11, under the control of the thermostat 14, is closed with respect to the flow of cool water. The warm water proceeds through the supply pipe and to the modulating three way valve 12. From there the warm water is pumped by the pump 13 into the water coil 2. The water releases heat into the air in the return air section 7, and the blower 1 moves the air into the mixing section 8. The air then passes through the supply air outlet 6 and warms the zone or room 20. The water exits water coil outlet 2 through the water coil outlet 10. If the room 20 is cold and immediate heating is required, then this process continues until the thermostat 14 detects the desired temperature is achieved, and none of the return water is recirculated though the coil 2. Or, if the room 20 is already relatively warm (close to the desired temperature of 75° Fahrenheit) the thermostat 14 will control the opening of the modulating three way valve 12. In this case, the modulating three way valve 12 will open an amount to allow flow from the return water runout 17A to flow through the modulating three way valve 12 and mix with incoming water from the supply pipe 21. The water then flows through the water coil 2. This process will repeat until the water in the return water runout 17A is about 75° Fahrenheit. At this point the room temperature and the water temperature will both be about 75° Fahrenheit. Once this temperature is reached, the water will flow out through the return water runout 17A and into return water main 17. The thermostat 14 controls the above processes in order to maintain the zone or room 20 temperature.

Of course, in other embodiments, the fluid which is circulated may be comprise fluids suitable for use in refrigeration systems.

It will be appreciated by those skilled in the art that while the variable constant volume cooling/heating unit has been described above in connection with particular embodiments and examples, the variable constant volume cooling/heating unit is not necessarily so limited and other embodiments, examples, uses, and modifications and departures from the embodiments, examples, and uses may be made without departing from the variable constant heating/cooling unit. All of these alternative embodiments are intended to be within the scope and spirit of the this invention.

What is claimed:

1. A variable constant volume cooling/heating unit comprising:
    a) a two position three way valve, a warm water runout pipe for supplying warm water, a cold water runout pipe for supplying cold water, the warm water runout pipe and cold water runout pipe connected to the two position three way valve,
    b) a modulating three way valve,
    c) a supply pipe connected to the two position three way valve and modulating three way valve, and wherein the modulating three way valve is located downstream from the supply pipe,
    d) a pump located downstream from the modulating three way valve,
    e) a water coil having a coil outlet and located downstream from the pump, the pump for pumping water through the water coil,
    f) a return water main and a return water runout pipe, the return water runout pipe connecting between the coil outlet and the return water main, the return water runout pipe connected to the coil outlet for receiving the flow of return water and connected to the return water main, and
    g) a connecting pipe connected to the modulating three way valve and return water runout pipe and for allowing return water to flow to the modulating three way valve and wherein the modulating three way valve is for allowing all, a portion of, or none of the return water to flow there through.

2. The variable constant volume cooling/heating unit according to claim 1 further comprising a thermostat in an electronic controlling relationship with the two position three way valve, the modulating three way valve, and the pump, the thermostat for controlling the two position three way valve, the modulating three way valve, and the pump.

3. The variable constant volume cooling/heating unit according to claim 1 wherein for maximum cooling, the two position three way valve is opened to allow flow from the cool water main, and the modulating three way valve is opened to allow flow of cool water to the water coil, and the modulating three way valve is closed with respect to the flow of return water exiting the water coil to prevent recirculation of the cool water through the water coil.

4. The variable constant volume cooling/heating unit according to claim 1 wherein for maximum heating the two position three way valve is opened to allow flow from the warm water main and the modulating three way valve is opened to allow flow to the water coil, and the modulating three way valve is closed with respect to the water exiting the water coil to prevent recirculation of the warm water through the water coil.

5. The variable constant volume cooling/heating unit according to claim 1 further comprising a thermostat and a ventilation air inlet having a damper that is in electronic communication with and under the control of the thermostat and the damper is used for controlling the rate of flow of incoming outside air.

6. The variable constant volume cooling/heating unit according to claim 1 further comprising a fan supported therein, the fan for drawing zone return air over the water coil to warm or cool the zone return air and further comprising and exhaust outlet for allowing the return air to be exhausted.

7. The variable constant volume cooling/heating unit according to claim 2 further comprising a fan and wherein the thermostat is in a controlling type relationship with the fan so that air circulation can be controlled.

8. A variable constant volume cooling/heating unit comprising:
    a) a two position three way valve, a warm water runout pipe and a cool water runout pipe, the warm water runout pipe and the cool water runout pipe connected to the two position three way valve, the warm water runout pipe for supplying warm water and the cool water runout pipe for supplying cool water, and a return main and a return water runout pipe for returning water to the return main,
    b) a modulating three way valve and a supply pipe connected between the two position three way valve and the modulating three way valve,
    c) a connecting pipe connecting the modulating three way valve and the return water runout pipe,
    d) a coil connecting between the three way modulating valve and the return water runout pipe,
    e) a pump located downstream of the modulating three way valve, and
    f) a thermostat in electronic communication with the two position three way valve and modulating three way valve, and the pump, the thermostat for controlling the two position three way valve, the modulating three way valve, and the pump so that none, a portion of, or all of the return water exiting the water coil is recirculated through the modulating three way valve and the water coil.

9. The variable constant volume cooling/heating unit according to claim 8 wherein in a full recirculation mode the modulating three way valve closes to cut off incoming water flow from the two position three way valve, and the pump recirculates the water through the water coil.

10. The variable constant volume cooling/heating unit according to claim 8 wherein for no recirculation, the modulating three way valve opens to allow the flow of incoming water and at the same time closes to prevent flow in the recirculation loop.

11. The variable constant volume cooling/heating unit according to claim 8 further comprising a ventilation air inlet through which incoming outside air flows, the ventilation air inlet has a damper in electronic communication with and under the control of the thermostat and the damper is used for controlling the rate of flow of the incoming outside air.

12. The variable constant volume cooling/heating unit according to claim 8 further comprising a fan for moving return air over the coil.

13. A method of heating and cooling with a variable constant volume cooling/heating unit comprising the acts of:
   a) providing a two position three way valve, a warm water pipe and a cool water pipe and connecting the warm water pipe and the cool water pipe to the two position three way valve, the warm water pipe used for supplying warm water and the cool water pipe used for supplying cool water, and providing a return water runout pipe connected to a return water main the return water runout pipe used for returning return water to the water main,
   b) positioning a modulating three way valve down stream from the two position three way valve and providing a supply pipe and connecting the two position three way valve to the modulating three way valve with the supply pipe,
   c) providing a pump downstream of the modulating three way valve and positioning a thermostat in electronic communication with the two position three way valve and the modulating three way valve and the pump, the thermostat for controlling the two position three way valve and the modulating three way valve,
   d) providing an electronic connection between the pump and thermostat,
   e) providing a coil, the pump used for pumping water through the coil and providing a fan for moving air across the coil, the coil used for warming or cooling the moving air, and
   f) using the thermostat for controlling the modulating three way valve to thus control the amount of water which is recirculated by the pump through the coil before the water is returned to the return water main through the return runout pipe.

14. The method of providing a variable constant volume cooling/heating unit according to claim 13 comprising the further acts of:
   a) providing maximum cooling of the air by opening the two position three way valve such that only cool water from the cool water main flows through the two position three way valve, and opening the modulating three way valve such that only cool water arriving through the supply pipe flows through the modulating three way valve and through the water coil, and closing the modulating three way valve with respect to the flow of return water so that return water does not recirculate through the water coil.

15. The method of providing a variable constant volume cooling/heating unit according to claim 13 comprising the further acts of:
   a) providing maximum heating of the air by opening the two position three way valve such that only warn water from the warm water main flows through the two position three way valve, and opening the modulating three way valve such that only warm water arriving through the supply pipe flows through the modulating three way valve and through the water coil, and the keeping the modulating three way valve closed with respect to the flow of warm water so return water does not recirculate through the water coil.

* * * * *

UNITED STATES PATENT AND TRADEMARK OFFICE
CERTIFICATE OF CORRECTION

PATENT NO.       : 6,834,714 B2  
APPLICATION NO.  : 10/718838  
DATED            : December 28, 2004  
INVENTOR(S)      : Paul J. Walsh Page 1 of 1

It is certified that error appears in the above-identified patent and that said Letters Patent is hereby corrected as shown below:

Title page, item (56), add the following U.S. Patent Documents cited by the Applicants during prosecution:

--3,712,026    01/1973    Griffiths et al.  
      3,850,007    11/1974    McFarlan  
      4,010,624    03/1977    McFarlan  
      4,559,788    12/1985    McFarlan  
      5,953,926    09/1999    Dressler et al.  
      6,199,388    03/2001    Fischer, Jr.--

Claim 13, line 11, before "water" insert --return--.

Signed and Sealed this

Second Day of September, 2008

JON W. DUDAS  
*Director of the United States Patent and Trademark Office*

UNITED STATES PATENT AND TRADEMARK OFFICE
CERTIFICATE OF CORRECTION

PATENT NO.         : 6,834,714 B2
APPLICATION NO. : 10/718838
DATED              : December 28, 2004
INVENTOR(S)       : Paul J. Walsh Page 1 of 1

It is certified that error appears in the above-identified patent and that said Letters Patent is hereby corrected as shown below:

Title page, item (56), add the following U.S. Patent Documents cited by the Applicants during prosecution:

| | | |
|---|---|---|
| --3,712,026 | 01/1973 | Griffiths et al. |
| 3,850,007 | 11/1974 | McFarlan |
| 4,010,624 | 03/1977 | McFarlan |
| 4,559,788 | 12/1985 | McFarlan |
| 5,953,926 | 09/1999 | Dressler et al. |
| 6,199,388 | 03/2001 | Fischer, Jr.-- |

Column 7, Claim 13, line 11, before "water" insert --return--.

This certificate supersedes the Certificate of Correction issued September 2, 2008.

Signed and Sealed this

Thirtieth Day of September, 2008

JON W. DUDAS
*Director of the United States Patent and Trademark Office*